(12) United States Patent
Takaoka et al.

(10) Patent No.: US 9,466,951 B2
(45) Date of Patent: Oct. 11, 2016

(54) SPARK PLUG

(71) Applicant: NGK SPARK PLUG CO., LTD., Nagoya-shi, Aichi (JP)

(72) Inventors: Katsuya Takaoka, Ichinomiya (JP); Hironori Uegaki, Nagoya (JP); Hirokazu Kurono, Nagoya (JP); Toshitaka Honda, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/441,315

(22) PCT Filed: Jun. 13, 2013

(86) PCT No.: PCT/JP2013/003712
§ 371 (c)(1),
(2) Date: May 7, 2015

(87) PCT Pub. No.: WO2014/073130
PCT Pub. Date: May 15, 2014

(65) Prior Publication Data
US 2015/0288150 A1    Oct. 8, 2015

(30) Foreign Application Priority Data

Nov. 8, 2012   (JP) .................................. 2012-246557

(51) Int. Cl.
*H01T 13/20*    (2006.01)
*H01T 13/38*    (2006.01)
(Continued)

(52) U.S. Cl.
CPC ............. *H01T 13/38* (2013.01); *C04B 35/111* (2013.01); *H01B 3/12* (2013.01); *H01B 7/2806* (2013.01);
(Continued)

(58) Field of Classification Search
CPC ............. C04B 2235/3224; C04B 2235/3225; C04B 2235/3227; C04B 2235/3206; H01T 13/39

USPC .................................................. 313/143, 118
See application file for complete search history.

(56) References Cited

U.S. PATENT DOCUMENTS

| | | | |
|---|---|---|---|
| 2008/0042539 A1 | 2/2008 | Walker | 313/135 |
| 2010/0136867 A1 | 6/2010 | Kurono et al. | 445/7 |

(Continued)

FOREIGN PATENT DOCUMENTS

| | | | | |
|---|---|---|---|---|
| CN | 101682175 A | 3/2010 | | C04B 35/111 |
| CN | 102365798 A | 2/2012 | | C04B 35/111 |

(Continued)

OTHER PUBLICATIONS

International Search Report Issued in corresponding International Patent Application No. PCT/JP2013/003712, dated Jul. 30, 2013.

(Continued)

*Primary Examiner* — Vip Patel
(74) *Attorney, Agent, or Firm* — Kusner & Jaffe

(57) ABSTRACT

A spark plug having an insulator formed of an alumina-based sintered material which contains an Si component and a rare earth element component that satisfy the following conditions (1) and (2): (1) an oxide-reduced amount of the Si component (mass %) is greater than or equal to 0.05 and less than or equal to 0.45; and (2) a ratio of an oxide-reduced amount of the rare earth element component to an oxide-reduced amount of the Si component is greater than or equal to 2.5 and less than or equal to 4.5, and which has alumina grains and an alumina grain boundary phase including a complex oxide crystal phase satisfying the following condition (3): (3) the complex oxide crystal phase contains at least two components selected from among an Al component, an Si component, a Group 2 element component, and a rare earth element component.

5 Claims, 2 Drawing Sheets

(51) Int. Cl.
  *H01B 3/12* (2006.01)
  *H01B 7/28* (2006.01)
  *C04B 35/111* (2006.01)

(52) U.S. Cl.
  CPC .......... *C04B 2235/3206* (2013.01); *C04B 2235/3208* (2013.01); *C04B 2235/3213* (2013.01); *C04B 2235/3215* (2013.01); *C04B 2235/3222* (2013.01); *C04B 2235/3224* (2013.01); *C04B 2235/3225* (2013.01); *C04B 2235/3227* (2013.01); *C04B 2235/3418* (2013.01); *C04B 2235/3463* (2013.01); *C04B 2235/786* (2013.01); *C04B 2235/80* (2013.01); *C04B 2235/85* (2013.01); *C04B 2235/96* (2013.01)

(56) References Cited

U.S. PATENT DOCUMENTS

| | | | |
|---|---|---|---|
| 2010/0229813 A1 | 9/2010 | Ogata et al. | 123/146.5 R |
| 2011/0077141 A1 | 3/2011 | Walker et al. | 501/32 |
| 2012/0007489 A1 | 1/2012 | Kurono et al. | 313/141 |
| 2012/0187819 A1 | 7/2012 | Takaoka et al. | 313/118 |

FOREIGN PATENT DOCUMENTS

| | | | |
|---|---|---|---|
| CN | 102745978 A | 10/2012 | C04B 35/10 |
| EP | 2413441 A1 | 2/2012 | H01T 13/38 |
| JP | 62-132765 (A) | 6/1987 | C04B 35/10 |
| JP | 2000-313657 (A) | 11/2000 | C04B 35/111 |
| JP | 2001-335360 A | 12/2001 | C04B 35/111 |
| JP | 2009-541940 A | 11/2009 | H01T 13/38 |
| JP | 2010-208901 A | 9/2010 | C04B 35/111 |
| WO | WO 2009/119098 A1 | 10/2009 | H01T 13/38 |
| WO | WO 2011/001656 A1 | 1/2011 | H01T 13/38 |

OTHER PUBLICATIONS

Office Action received in corresponding Chinese Patent Application No. 201380058484.9, dated Jan. 21, 2016.

Extended Search Report issued in corresponding European Patent Application No. 13853843.4, dated May 30, 2016.

SPARK PLUG

RELATED APPLICATIONS

This application is a National Stage of International Application No. PCT/JP13/03712 filed Jun. 13, 2013, which claims the benefit of Japanese Patent Application No. 2012-246557, filed Nov. 8, 2012.

FIELD OF THE INVENTION

The present invention relates to a spark plug, and more particularly, to a spark plug having an insulator which exhibits, at high temperature, excellent withstand voltage characteristics and high mechanical strength.

BACKGROUND OF THE INVENTION

Alumina-based sintered material, containing alumina as a predominant component, is excellent in withstand voltage characteristic, heat resistance, mechanical strength, or the like, and is an inexpensive material. Therefore, the sintered material is employed for producing ceramic products, such as a spark plug ceramic insulator (may be referred to simply as "insulator" in the specification) and a multi-layer wiring board of IC packages. Such alumina-based sintered material has been produced by sintering a powder mixture containing a sintering aid including SiO2.

However, when a spark plug insulator is produced from an alumina-based sintered material produced through sintering a raw material with a sintering aid, after sintering, the sintering aid (mainly an Si component) remains at the grain boundary among alumina crystal grains as a low-melting-point glass phase. In this case, the low-melting-point glass phase is softened in a spark plug use environment, such as in a high temperature environment of about 600° C. or higher, impairing the withstand voltage characteristics of the insulator.

Meanwhile, internal combustion engines to which a spark plug is to be attached are designed for a small-scale and/or a high-output mode, and increase in area of an intake or an exhaust valve in a combustion chamber, employment of a 4-valve configuration, high compression ratio, etc. have been proposed. Thus, the spark plug which is to be attached to such an internal combustion engine designed for a small-scale and/or a high-output mode must maintain excellent withstand voltage characteristics and have an insulator which is prevented from breakdown and which has high mechanical strength under high-temperature conditions, even though the spark plug is thinned and downsized.

In recent years, for the protection of the global environment or other reasons, a biofuel such as ethanol, a mixed fuel of a fossil fuel and a bio fuel, and the like have come to be used in addition to fossil fuels such as gasoline. Such a biofuel or a mixed fuel contains a soda component, which corrodes the insulator. Thus, the withstand voltage characteristics and mechanical strength of the insulator are impaired.

Meanwhile, International Publication WO 2009/119098 discloses "A spark plug . . . the insulator is formed of a dense alumina-based sintered material having a mean crystal grain size $D_A$ (Al) of 1.50 µm or more; the alumina-based sintered material contains an Si component and, among Group 2 elements (the Group included in the periodic table defined by Recommendations 1990, IUPAC), Mg and Ba, as essential components, and a Group 2 element (2A) component containing at least one element other than Mg and Ba, and a rare earth element (RE) component, wherein the ratio of the Si component content S (oxide-reduced mass %) to the sum (S+A) of S and the Group 2 element (2A) component content A (oxide-reduced mass %) is 0.60 or higher" (see claim 1, International Publication WO 2009/119098).

Japanese Patent Application Laid-Open (kokai) No. 2010-208901 discloses "an alumina-based sintered material . . . characterized in that the alumina crystals have a mean crystal grain size of 2 µm or less; the crystal grain boundary phase has a high-melting-point phase containing at least $Y_2Si_2O_7$ as the yttrium component and $SiO_2$; and the alumina-based sintered material contains the high-melting-point phase in an amount of 0.1 wt. % to 15 wt %. with respect to 100 wt. % of the alumina-based sintered material" (see claim 1, Japanese Patent Application Laid-Open (kokai) No. 2010-208901).

An object of the present invention is to provide a spark plug having an insulator which has excellent corrosion resistance and which exhibits, at high temperature, excellent withstand voltage characteristics and high mechanical strength; i.e., small percent drops in withstand voltage characteristics and mechanical strength when the temperature rises further from a high temperature.

SUMMARY OF THE INVENTION

[1] In accordance with a first embodiment of the present invention, there is provided a spark plug having an insulator formed of an alumina-based sintered material which contains an Si component and a rare earth element component in such amounts that satisfy the following conditions (1) and (2):

(1) 0.05≤oxide-reduced amount of the Si component (mass %)≤0.45; and (2) 2.5≤[(oxide-reduced amount of the rare earth element component)/(oxide-reduced amount of the Si component)]≤ 4.5, and which has alumina grains and an alumina grain boundary phase including a complex oxide crystal phase satisfying the following condition (3):

(3) the complex oxide crystal phase contains at least two components selected from among an Al component, an Si component, a Group 2 element component, the Group included in the periodic table defined by Recommendations 1990, IUPAC, (hereinafter may be referred to simply as a Group 2 component), and a rare earth element component.

In accordance with another aspect of the present invention, there is provided a spark plug as described above, wherein the alumina-based sintered material contains the Al component in an oxide-reduced amount of 97 mass % or more, with respect to the total mass of the alumina-based sintered material as 100 mass %.

[3] In accordance with a third aspect of the present invention, there is provided a spark plug as described in [1] or [2] above, the alumina-based sintered material contains the Group 2 component in such an amount that satisfies the following condition (4):

(4) 0.05≤[(oxide-reduced amount of an Mg component)/ (oxide-reduced amount of the Group 2 component)]≤0.35;

the alumina grains have a mean grain size of 2 to 6.5 µm; and the complex oxide crystal phase includes crystals containing the Al component.

[4] In accordance with a fourth aspect of the present invention, there is provided a spark plug as described in any one of [1] to [3] above, wherein the alumina-based sintered material contains the Group 2 component and the rare earth element component in such amounts that satisfy the following condition (5):

(5) $0.25 \leq [(\text{oxide-reduced amount of the Group 2 component})/(\text{oxide-reduced amount of the rare earth element component})] \leq 0.95$.

[5] In accordance with a fifth aspect of the present invention, there is provided a spark plug as described in [4] above, wherein in an arbitrary cut surface of the insulator formed of the alumina-based sintered material, a total area corresponding to the alumina grains, a total area corresponding to portions of the complex oxide crystal phase, and a total area of pores satisfy the following conditions:

$0.46 \leq [(\text{the total area corresponding to the complex oxide crystal phase portions})/(\text{the total area corresponding to the alumina grains})]$; and $[(\text{the total area corresponding to the pores})/(\text{the total area corresponding to the alumina grains})] \leq 0.024$.

According to the present invention, the aforementioned conditions (1) to (3) are fully satisfied. Thus, the invention can provide a spark plug having an insulator which has excellent corrosion resistance and which exhibits, at high temperature, excellent withstand voltage characteristics and high mechanical strength; i.e., small percent drops in withstand voltage characteristics and mechanical strength when the temperature rises further from a high temperature.

According to the present invention, the aforementioned condition (4) is also satisfied. Thus, in the alumina-based sintered material, alumina grains having a mean grain size falling within a specific range can be readily formed, and crystals containing an Al component can be readily formed to provide the complex oxide crystal phase. In the insulator formed of such an alumina-based sintered material, progress of cracking, which would otherwise occur in the alumina grain boundary phase at high temperature, can be suppressed. Therefore, the insulator has excellent corrosion resistance, and, when the temperature rises from a high temperature (e.g., 600° C.) to a higher temperature (e.g., 800° C. or higher), drops in withstand voltage characteristics and mechanical strength, can be further suppressed.

According to the present invention, the aforementioned condition (5) is also satisfied. Thus, in the alumina-based sintered material, a complex oxide crystal phase is readily formed to an acceptable degree, and pores are not readily provided in the alumina grain boundary phase. In the insulator formed of such an alumina-based sintered material, dielectric breakdown, which would otherwise be caused from the alumina grain boundary phase and pores at high temperature, can be suppressed. Therefore, the insulator has excellent corrosion resistance, and, when the temperature rises from a high temperature (e.g., 600° C.) to a higher temperature (e.g., 800° C. or higher), drops in withstand voltage characteristics and mechanical strength can be further suppressed.

DETAILED DESCRIPTION OF THE PREFERRED EMBODIMENTS

A spark plug according to the present invention essentially has an insulator satisfying the aforementioned conditions. For example, the spark plug includes a center electrode, a generally cylindrical insulator surrounding the center electrode and satisfying the aforementioned conditions, and a ground electrode disposed such that one end of the ground electrode faces the center electrode via a spark discharge gap. So long as the spark plug has an insulator satisfying the aforementioned conditions, no particular limitation is imposed on the remaining structure of the spark plug of the invention, and any of various known structures may be employed.

Figure 1A:
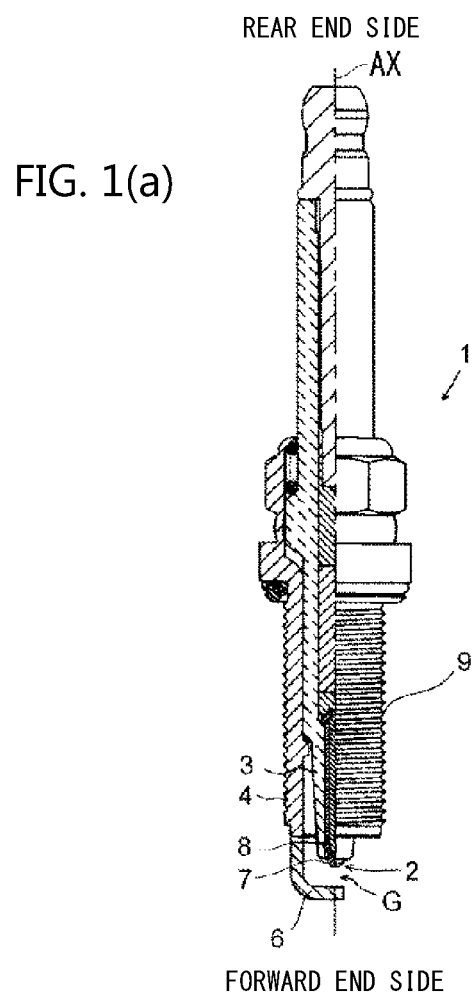
FIG. 1(a) is a partially-sectioned overall view of a spark plug which is one example of the spark plug according to the present invention.
Figure 1B:
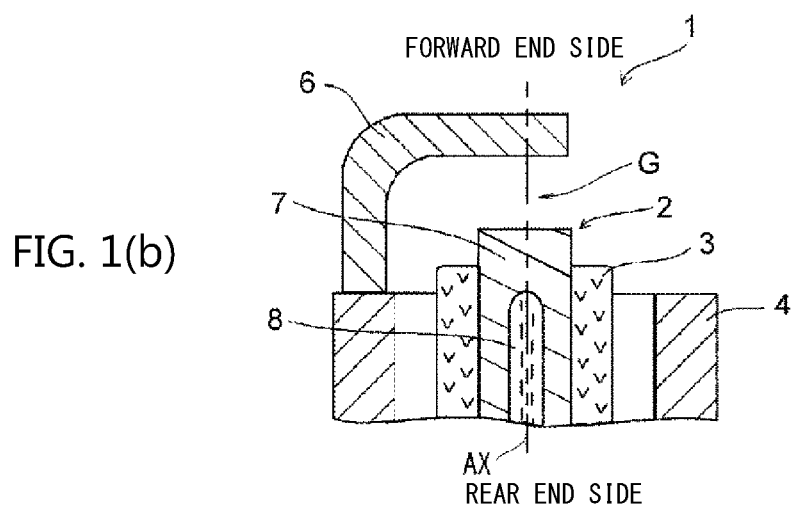
FIG. 1(b) is a sectional view showing a main portion of the spark plug which is one example of the spark plug according to the present invention.

Hereinafter, with reference to FIG. 1, the spark plug according to the present invention, and the insulator, which is an essential member of the spark plug, will be described. FIG. 1(a) is a partially-sectioned overall view of the spark plug 1 which is one example of the spark plug according to the present invention, and FIG. 1(b) is a sectional view showing a main portion of the spark plug 1 which is one example of the spark plug according to the present invention. In the following description, the lower side of FIG. 1(a) will be referred to as the forward end side with respect to the direction of an axis AX, and the upper side of FIG. 1(a) will be referred to as the rear end side with respect to the direction of the axis AX. Also, the upper side of FIG. 1(b) will be referred to as the forward end side with respect to the direction of the axis AX, and the lower side of FIG. 1(b) will be referred to as the rear end side with respect to the direction of the axis AX.

As shown in FIGS. 1(a) and 1(b), the spark plug 1 includes a generally rod-shaped center electrode 2; a generally cylindrical insulator 3 surrounding the center electrode 2; a cylindrical metallic shell 4 holding the insulator 3; and a ground electrode 6. One end of the ground electrode 6 is disposed to face the forward end surface of the center electrode 2 via a spark discharge gap G, and the other end of the ground electrode 6 is joined to the metallic shell 4.

The metallic shell 4 has a cylindrical shape, and holds the insulator 3 inserted thereinto. A screw portion 9 is formed on the outer circumferential surface of a forward end portion of the metallic shell 4. The spark plug 1 is attached to the cylinder head of an unillustrated internal combustion engine by making use of the screw portion 9. The metallic shell 4 may be formed of an electrically conductive steel material, such as low carbon steel. Examples of the standard of the screw portion 9 include M10, M12, and M14. In the present invention, the nominal diameter of screw portion 9 refers to a value defined in ISO2705 (M12), ISO2704 (M10), and the like. Needless to say, variance in nominal diameter may be acceptable, so long as the variance falls within size tolerances stipulated in such standards. In the case where the spark plug 1 is attached to a recent internal combustion engine of a small-scale and/or a high-output mode, the nominal diameter of the screw portion 9 is generally M10 or less. Generally, when the nominal diameter of the screw portion 9 is smaller, the thickness of the insulator 3 cannot be ensured. In this case, withstand voltage characteristics and mechanical strength readily and considerably drop. In contrast, according to the present invention, the insulator 3 satisfies the below-described conditions (1) to (3), excellent withstand voltage characteristics and mechanical strength can be attained.

The center electrode 2 assumes a generally rod-like body extending in the axis direction AX and is composed of an outer member 7 and an inner member 8 formed such that the inner material 8 is concentrically embedded at the center of the outer member 7. The center electrode 2 is fixed to the insulator 3 such that its forward end portion projects from the forward end surface of the insulator 3, whereby the center electrode 2 is held by the metallic shell 4 and is insulated therefrom. The outer member 7 of the center electrode 2 may be formed of a Ni-based alloy, which is excellent in heat resistance and corrosion resistance. The inner member 8 of the center electrode 2 may be formed of a metallic material which is excellent in heat conductivity such as copper (Cu) or nickel (Ni).

The ground electrode 6 has, for example, a prismatic shape. One end of the ground electrode 6 is joined to the end surface of the metallic shell 4, and is bent into a generally L-like shape. The shape and configuration of the ground electrode 6 are designed such that a distal end portion of the ground electrode 6 is aligned with the axis AX of the center electrode 2. Since the ground electrode 6 is designed in this manner, the other end of the ground electrode 6 faces the center electrode 2 via the spark discharge gap G. The spark discharge gap G is a gap between the forward end surface of the center electrode 2 and the surface of the ground electrode 6, and is generally set to 0.3 to 1.5 mm. Since the ground electrode 6 is exposed to a higher temperature, as compared with the center electrode 2, preferably, the ground electrode 6 is formed of an Ni-based alloy or the like which is more excellent than the Ni-based alloy of the center electrode 2 in terms of heat resistance corrosion resistance, etc.

The insulator 3 is formed of the below-described alumina-based sintered material into a generally cylindrical shape, and has an axial hole for holding the center electrode 2 along the axis AX of the insulator 3. The insulator 3 is held or fixed by an inner circumferential portion of the metallic shell 4 by the mediation of talc and/or packing or the like (not shown), such that a forward end portion of the insulator 3 projects from the forward end surface of the metallic shell 4. In the case where the nominal diameter of the screw portion 9 of the metallic shell 4 is adjusted to M10 or less, the insulator 3 must have a small wall thickness of 0.7 to 1.0 mm, as measured at the forward end surface of the metallic shell 4. In the present invention, since the alumina-based sintered material forming the insulator 3 satisfies the below-described conditions, the wall thickness can be adjusted to the above target level, without considerably impairing the characteristics thereof.

Next, the alumina-based sintered material, which forms the insulator 3 of the spark plug 1, will be described in detail. The alumina-based sintered material contains an Si component and a rare earth element component in such amounts that satisfy the conditions (1) and (2) and which has alumina grains and an alumina grain boundary phase including a complex oxide crystal phase satisfying the condition (3).

The alumina-based sintered material contains alumina (Al2O3) as a predominant component. As used herein, the term "predominant component" refers to a component of the highest content. When a sintered material contains an Al component as a predominant component, the sintered material is excellent in withstand voltage characteristic, heat resistance, mechanical strength, and the like.

The Al component content of the alumina-based sintered material is preferably 97 mass % or more, with respect to the total mass of the oxide-reduced components of the alumina-based sintered material formed through firing as 100 mass %. When the Al component content is 97 mass % or more, the insulator of the spark plug of the present invention exhibits consistently excellent withstand voltage characteristics and mechanical strength, at high temperature. The upper limit of the Al component content may be less than 100 mass % and is preferably 99.5 mass % or less. As used herein, the Al component content refers to the amount of Al component oxide; i.e., Al2O3.

The Si component originates from the sintering aid employed in sintering and is present in the form of oxide, ion, etc. in the alumina-based sintered material. The Si component melts during sintering, to generally form a liquid phase. That is, the Si component serves as a sintering aid promoting the densification of the formed sintered material. After completion of sintering, the Si component generally forms a low-melting-point glass or the like at the grain boundary phase defined by alumina crystal grains. However, when the alumina-based sintered material containing the Si component further contains the below-mentioned specific components at specific proportions, the Si component tends to preferentially form a complex oxide crystal phase or the like with other components (e.g., an Al component) in the alumina grain boundary phase, rather than a low-melting-point glass phase. The low-melting-point glass phase formed in the alumina grain boundary phase gradually softens, as temperature rises. In this case, dielectric breakdown is considerably induced upon application of stress load or high voltage thereto. However, rather than a low-melting-point glass phase, a high-melting-point complex oxide crystal phase is more readily formed in the alumina-based sintered material of the present invention, whereby the percent drops in withstand voltage characteristics and mechanical strength, when the temperature rises further from a high temperature, can be reduced.

The alumina-based sintered material contains a rare earth element component originating from the sintering aid employed in sintering, and includes Sc, Y, and lanthanoid elements. Specifically, the rare earth element component includes an Sc component, a Y component, a La component, a Ce component, a Pr component, an Nd component, a Pm component, an Sm component, an Eu component, a Gd component, a Tb component, a Dy component, an Ho component, an Er component, a Tm component, a Yb component, and an Lu component. The rare earth element component is present in the form of oxide, ion, etc. in the alumina-based sintered material. The rare earth element component, employed in sintering, suppresses excessive grain growth of alumina during sintering and forms a complex oxide crystal phase in the alumina grain boundary phase as mentioned below, with the Al component, the Si component, and/or the Group 2 component, to thereby improve the high-temperature withstand voltage characteristics and mechanical strength of the insulator 3 produced from the alumina-based sintered material. The rare earth element component may be any of the aforementioned components, but is preferably at least one component selected from the group consisting of a Y component, an La component, a Pr component, an Nd component, and a Yb component.

The Group 2 component originates from the sintering aid employed in sintering and may include at least one element of the Group 2 elements in the periodic table defined by Recommendations 1990, IUPAC. From the viewpoint of low toxicity, Mg, Ca, Sr, and Ba are preferred. The Mg component, the Ca component, the Sr component, and the Ba component each originate from the sintering aid employed in sintering and are present in the form of oxide, ion, etc. in the alumina-based sintered material. Similar to the Si component before sintering, these components serve as a sintering aid, and form a complex oxide crystal phase in the alumina grain boundary phase as mentioned below, with the Al component, the Si component, and/or the rare earth component, to thereby improve the high-temperature withstand voltage characteristics and mechanical strength of the insulator 3 produced from the alumina-based sintered material.

The alumina-based sintered material contains an Si component and a rare earth element component in such amounts that satisfy the following conditions (1) and (2):

(1) 0.05≤oxide-reduced amount of the Si component (mass %)≤0.45; and (2) 2.5≤[(oxide-reduced amount of the rare earth element component)/(oxide-reduced amount of the Si component)]≤ 4.5, with respect to the oxide-reduced total mass of the alumina-based sintered material as 100 mass %.

Condition (1) relates to the Si component content. Specifically, the Si component content, as reduced to oxide ($SiO_2$), is 0.05 mass % to 0.45 mass %.

When the Si component content of the alumina-based sintered material satisfies condition (1), an $SiO_2$-based glass phase having relatively low melting point, and a crystal phase having relatively low melting point are difficult to form in the alumina grain boundary, and the below-mentioned high-melting-point complex oxide crystal phase is readily formed, to thereby improve the high-temperature withstand voltage characteristics and mechanical strength of the insulator 3 produced from the alumina-based sintered material.

The low-melting-point glass phase formed in the alumina grain boundary phase gradually softens, as temperature rises. In this case, dielectric breakdown is considerably induced upon application of stress load or high voltage thereto.

Also, the glass phase is susceptible to corrosion by a soda component or the like contained in an alcohol fuel or the like. In this case, withstand voltage characteristics and mechanical strength may be impaired.

However, rather than a low-melting-point glass phase, a high-melting-point complex oxide crystal phase is more readily formed in the alumina-based sintered material of the present invention, whereby, when the temperature rises further from a high temperature, drops in withstand voltage characteristics and mechanical strength can be reduced.

In addition, the alumina-based sintered material of the present invention has excellent corrosion resistance to a soda component or the like contained in an alcohol fuel or the like.

Even in the case where the Si component is not intentionally added as a raw material of the alumina-based sintered material, the Si component is incorporated into the alumina-based sintered material is present as an unavoidable impurity originating from a raw material of the alumina component or the like, and the amount thereof is at least 0.05 mass %. When the Si component content is in excess of 0.45 mass %, a glass phase having relatively low melting point, and a crystal phase having relatively low melting point are readily formed in the alumina grain boundary phase. The presence of the low-melting-point glass phase and/or the low-melting-point crystal phase more readily affects high-temperature withstand voltage characteristics and mechanical strength. Notably, the Si component content is adjusted within the aforementioned range so as to satisfy condition (2).

Condition (2) represents the ratio of the rare earth element component content to the Si component content (herein after may be referred to as an "RE/Si component ratio"). The rare earth element component content is an oxide-reduced amount of the rare earth element component on the mass % basis. For example, the oxide-reduced amount of "$La_2O_3$," "$Nd_2O_3$," "$Pr_2O_3$," "$Y_2O_3$," or "$Yb_2O_3$" is on the mass % basis. When the rare earth element component includes a plurality of rare earth elements, the rare earth element component content is the total amount thereof.

When the alumina-based sintered material contains the Si component and the rare earth element component in such amounts that satisfy conditions (1) and (2), the below-mentioned complex oxide crystal phase can be more readily formed in the alumina grain boundary phase. When the RE/Si component ratio is less than 2.5, a low-melting-point glass phase and/or a low-melting-point crystal phase are preferentially formed, and the below-mentioned complex oxide crystal phase is difficult to form. When the alumina grain boundary phase includes such a low-melting-point glass phase and/or a low-melting-point crystal phase, the grain boundary phase gradually softens, as temperature rises. In this case, dielectric breakdown tends to occur. When the RE/Si component ratio is in excess of 4.5, a crystal phase containing large-size rare earth elements is preferentially formed, and such a coarse crystal phase impedes sintering, thereby failing to yield a dense alumina-based sintered material. In this case, high-temperature withstand voltage characteristics and mechanical strength are impaired.

The alumina-based sintered material has alumina grains forming a main crystal phase and an alumina grain boundary phase which is present in a space surrounded by a plurality of alumina grains. The alumina grain boundary phase has a complex oxide crystal phase satisfying the following condition (3).

Condition (3): the complex oxide crystal phase contains at least two elements selected from among an Al component, an Si component, a Group 2 element component, the Group included in the periodic table defined by Recommendations 1990, IUPAC, and a rare earth element component.

Examples of the crystal species contained in the complex oxide crystal phase include $RE_aAl_bO_c$, $(RE)_a(RE')_bAl_cO_d$, $(2A)_aAl_bO_c$, $(2A)_a(2A')_bAl_cO_d$, $(2A)_aSi_bO_c$, $(2A)_a(2A')_bSi_cO_d$, $(2A)_aAl_bSi_cO_d$, $(2A)_a(2A')_bAl_cSi_dO_e$, $(2A)_a(2A')_bO_c$, and $(RE)_a(RE')_bO_c$ (wherein a, b, c, d, or e is a positive number). Specific examples include $REAl_{11}O_{18}$, $RE_4Al_2O_9$, $REAlO_3$, $Al_2RE_4O_9$, $(2A)Al_2O_4$, $(2A)2AlO_4$, $(2A)Al_{12}O_{19}$, $(2A)3SiO_5$, $(2A)3Si_2O_7$, $(2A)Si_2O_5$, $(2A)(2A')SiO_4$, $(2A)(2A')2SiO_7$, $(2A)3(2A')Si_2O_8$, and $(2A)Al_2Si_2O_8$. In the aforementioned complex oxide crystal species, RE represents one rare earth element, and RE' represents another rare earth element other than RE. Also, 2A represents one Group 2 element, and 2A' represents another Group 2 element other than 2A.

The complex oxide crystal phase may be identified through the following procedure. Specifically, the crystal phases of the alumina-based sintered material may be confirmed through element analysis by means of, for example, an energy dispersive X-ray analyzer (EDX) (product of EDAX, EDX: "Genesis 4000," detector: SUTW3.3RTEM) combined with a transmission electron microscope (TEM) (product of HITACHI, model "HD-2000") under the following measurement conditions. <Measurement conditions, etc.> (1) Acceleration voltage: 200 kV; (2) Irradiation mode: HR (spot size: about 0.3 nm); and (3) Measurements by means of an energy dispersive X-ray analyzer (EDX) calculated as oxide-reduced mass %. The oxide(s) other than the Al component oxide, the Si component oxide, the rare earth element component oxide, and the Group 2 component oxide present in an amount (oxide-reduced mass %) of 1 mass % or less is/are considered as an impurity/impurities.

The presence of complex oxide crystals may be identified by use of X-ray diffraction chart obtained through X-ray diffractometry compared with the JCPDS cards. Notably, since no data is found in the JCPDS cards with respect to a Pr component and an Nd component, such a component cannot be directly identified through X-ray diffractometry. However, since the ionic radius of $Pr^{3+}$ and that of $Nd^{3+}$ are almost equivalent to that of $La^{3+}$, a complex oxide crystal containing a Pr component and an Nd component exhibits an X-ray diffraction spectrum similar to that of a complex oxide crystal containing an La component shown in the JCPDS card thereof. Thus, the complex oxide crystal containing a Pr component and an Nd component can be identified with reference to the JCPDS card of the complex oxide crystal containing an La component. The X-ray diffractometry may be performed by means of, for example, MiniFLex (product of Rigaku) under the following conditions: measurement angle range; 20 to 70°, voltage; 30 kV, current; 15 mA, scanning speed; 1, and step; 0.02.

All the aforementioned crystal species have a melting point as high as 1,750 to 2,400° C. When a complex oxide crystal phase containing such a crystal species is present in the alumina grain boundary phase, drops in withstand voltage characteristics and mechanical strength, when the temperature rises further from a high temperature (e.g., 600° C.) to a higher temperature (e.g., 800° C. or higher), are reduced. When the alumina grain boundary phase contains a low-melting-point crystal phase having a melting point lower than 1,750° C. as a main phase, the alumina grain boundary phase gradually softens, as temperature rises. In this case, dielectric breakdown is considerably induced upon application of stress load or high voltage thereto. When the alumina grain boundary phase predominantly contains a ultra-high-melting-point crystal phase having a melting point higher than 2,400° C., sinterability decreases, thereby failing to yield a dense alumina-based sintered material. In this case, high-temperature withstand voltage characteristics and mechanical strength are impaired.

The Al component content, the Si component content, the rare earth element component content, and the optional Group 2 component content of the alumina-based sintered material may be determined as an oxide-reduced mass or an oxide-reduced mass % by means of, for example, an electron probe microanalyzer (EPMA). Notably, the component contents of the alumina-based sintered material of the present invention determined by means of an electron probe microanalyzer substantially coincide with the relative amounts of the components for producing the alumina-based sintered material. Therefore, each component content and a related ratio can be regulated by modifying the relative amounts of the component raw material powders.

The alumina-based sintered material contains an Si component and a rare earth element component in amounts satisfying the conditions (1) and (2), and is substantially formed of the Al component, Si component, rare earth element component, and optional Group 2 component. As used herein, the term "substantially formed of" refers to that no component other than the above components is intentionally incorporated into the sintered material through addition or a similar technique. However, in some cases, each component of the alumina-based sintered material contains unavoidable impurities and the like in small amounts. Thus, the alumina-based sintered material may contain unavoidable impurities in addition to the above components, so long as the object of the present invention is not impaired. Examples of the unavoidable impurities which may be included in the alumina-based sintered material include Na, S, and N. The total amount of the unavoidable impurities is preferably small; e.g., 1 part by mass or less, with respect to the total mass of the Al component, Si component, rare earth element component, and Group 2 component, as 100 parts by mass.

Preferably, the alumina-based sintered material contains a Group 2 component in such an amount that satisfies the following condition (4):

(4) 0.05≤[(oxide-reduced amount of an Mg component)/(oxide-reduced amount of the Group 2 component)]≤0.35.

Condition (4) represents the ratio of the Mg component content to the Group 2 component content (hereinafter may be referred to as an "Mg/Group 2 component ratio"). The Group 2 component content is an oxide-reduced amount of the Group 2 component on the mass % basis. For example, the oxide-reduced amount of "MgO," "BaO," "CaO," or "SrO" is on the mass % basis. When the Group 2 component includes a plurality of Group 2 elements, the Group 2 component content is the total amount thereof.

When the Mg/Group 2 component ratio falls within the aforementioned range, excessive growth of alumina grains is prevented. In addition, the complex oxide crystal phase in the alumina grain boundary phase readily transforms into Al-component-containing crystals. Thus, the alumina-based sintered material exhibits excellent withstand voltage characteristics and mechanical strength at high temperature.

When the alumina grains are excessively grown, cracking occurring in the alumina grain boundary phase readily progresses. However, if condition (4) is satisfied, excessive growth of alumina grains is prevented, whereby progress of cracking in the alumina grain boundary phase can be suppressed. Also, when condition (4) is satisfied, Al-component-containing crystals are readily formed in the alumina grain boundary phase. The shape of the crystals tends to assume needle-like. In this case, if cracking occurs, progress of cracking is inhibited. Furthermore, when a large number of needle-like crystals having an aspect ratio of 4 to 5 are randomly arranged in the alumina grain boundary phase, progress of cracking is further prevented.

The Mg component inhibits growth of alumina grains. Therefore, when the Mg/Group 2 component ratio is less than 0.05, the effect of the Mg component on inhibition of crystal grain growth fails to be attained, and excessive growth of alumina grains may occur. When excessive growth of alumina grains occurs, cracking which has occurred in the alumina grain boundary phase readily progresses. When the Mg/Group 2 component ratio is in excess of 0.35, Al-component-containing crystals present in the alumina grain boundary phase readily grow, and grain-shape crystals having an aspect ratio less than 4 are readily formed. In the case where crystals contained in the alumina grain boundary phase have considerably grown, and the grown crystals have a grain shape, cracking which has occurred in the alumina grain boundary phase readily progresses.

The alumina grains preferably have a mean grain size of 2 to 6.5 μm. When the alumina grains have a mean grain size falling within the range, the glass phase, which tends to serve as a breakdown-causing point in the alumina-based sintered material, is fragmented to thereby inhibit formation of a continuous phase, whereby progress of cracking in the alumina grain boundary phase can be inhibited. Thus, the alumina-based sintered material has excellent corrosion resistance and exhibits, at high temperature, excellent withstand voltage characteristics and high mechanical strength. When the Mg/Group 2 component ratio falls within the aforementioned range, alumina grains having a mean grain size of 2 to 6.5 μm tend to be formed.

The aforementioned complex oxide crystal phase preferably contains Al-component-containing crystals.

When the Mg/Group 2 component ratio falls within the aforementioned range, Al-component-containing crystals which form the complex oxide crystal phase tend to assume needle-like crystals, particularly those having an aspect ratio of 4 to 5. Furthermore, a large number of such crystals are randomly arranged in the alumina grain boundary phase.

When needle-like crystals, particularly those having a specific aspect ratio, are randomly arranged in the complex oxide crystal phase, if cracking occurs in the alumina grain boundary phase, progress of the cracking can be inhibited.

Thus, when the alumina-based sintered material contains the Group 2 component in such an amount that satisfies the following condition (4), the alumina grains have a mean grain size falling within a specific range, and the complex oxide crystal phase contains Al-component-containing crystals, if cracking occurs in the alumina grain boundary phase, progress of the cracking can be inhibited, whereby the alumina-based sintered material has excellent corrosion resistance and exhibits, at high temperature, excellent withstand voltage characteristics and high mechanical strength.

The mean grain size of the alumina grains may be determined by means of a scanning electron microscope (SEM). Specifically, a surface or a certain cross-section of the alumina-based sintered material is mirror-polished, and the polished surface is subjected to thermal etching at a temperature 100° C. lower than the firing temperature for producing the alumina-based sintered material, for 10 minutes. The thus-treated surface is observed under a scanning electron microscope (SEM), and a photoimage of the observed area (×2,000) is taken. The thus-taken photoimage is subjected to "binarization (also called 2-gradation treatment)" by use of an image-analysis software application "WinROOF" (product of Mitani Corporation) through the following "binarization method" under the following "binarization conditions." As a result, the complex oxide crystal phase is imaged as a "low-color-density area," and the main crystal phase of alumina is imaged as a "high-color-density area." In one specific procedure, the mean grain size of the alumina grains is obtained through the intercept technique, assuming that the "high-color-density area" obtained through binarization is one crystal grain of alumina crystals, and arithmetically averaging the obtained grain size measurements.

Binarization Method and Conditions (1) In the image (1,280 pixels (horizontal)×1,024 pixels (vertical)) of the surface taken through the aforementioned treatment, a secondary electron image and a reflected electron image are checked. In the case where the reflected electron image includes a combined low-color-density where two or more "high-color-density areas" adjacent to one another are merged or connected, a line is drawn along the interface between "high-color-density areas" (corresponding to the grain boundary), to thereby clarify the boundary between "high-color-density areas."

(2) For improving the reflected electron image, the reflected electron image is smoothened while the edge of each "high-color-density area" is maintained.

(3) A "threshold value" in binarization is predetermined for exclusively extracting "high-color-density areas" from the reflected electron image. More specifically, from the reflected electron image, brightness values are plotted along the horizontal axis (brightness) and occurrence values along the vertical axis, to thereby obtain a graph. Since the thus-obtained graph has a two-peak profile, the midpoint between the peaks is employed as the "threshold value."

(4) The "high-color-density areas" are extracted from a certain area (40 μm×30 μm) selected from the reflected electron images.

(5) For improving the image quality of the thus-selected area; i.e., the thus-extracted "high-color-density areas," defects shown in the selected areas are restored.

(6) From the images of the selected areas, any "high-color-density area" having a diameter of 10 pixels or less is removed.

(7) Thus, "high-color-density areas" are extracted.

The average aspect ratio of the complex oxide crystal grains may be derived by measuring the longer side and the shorter side of each "low-color-density area" obtained in the same manner as employed in determination of the mean grain size of alumina grains, to thereby derive the aspect ratio (longer side/shorter side), and averaging the obtained aspect ratios.

Preferably, the alumina-based sintered material contains the Group 2 component and the rare earth element component in such amounts that satisfy the following condition (5):

$0.25 \leq$ [(oxide-reduced amount of the Group 2 component)/(oxide-reduced amount of the rare earth element component)]$\leq 0.95$.

Condition (5) represents the ratio of the Group 2 component content to the rare earth element component content (hereinafter may be referred to as a "Group 2/RE component ratio"). Similar to condition (4), the Group 2 component content is an oxide-reduced amount of the Group 2 component on the mass % basis. Similar to condition (2), the rare earth element component content is an oxide-reduced amount of the rare earth element component on the mass % basis. When the Group 2 component includes a plurality of Group 2 elements, the Group 2 component content is the total amount thereof. When the rare earth element component includes a plurality of rare earth elements, the rare earth element component content is the total amount thereof.

When the Group 2/RE component ratio falls within the above range, a high-melting-point complex oxide crystal phase can be more readily formed in the alumina grain boundary, and pores are difficult to provide. As describe hereinbelow, the area ratios of alumina grains, complex oxide crystal phase portions, and pores respectively can be readily adjusted to fall within specific ranges. As a result, the alumina-based sintered material has excellent corrosion resistance, and, when the temperature rises from a high temperature (e.g., 600° C.) to a higher temperature (e.g., 800° C. or higher), exhibits small drops in withstand voltage characteristics and mechanical strength. Thus, excellent withstand voltage characteristics and mechanical strength can be attained at high temperature.

Preferably, the alumina-based sintered material exhibits, in an arbitrary cut surface of the insulator formed of the alumina-based sintered material, a total area corresponding to the alumina grains, a total area corresponding to portions of the complex oxide crystal phase, and a total area of pores satisfying the following conditions:

$0.46 \leq$ [(the total area corresponding to the complex oxide crystal phase portions)/(the total area corresponding to the alumina grains)]$\leq 0.52$; and [(the total area corresponding to the pores)/(the total area corresponding to the alumina grains)]$\leq 0.024$. When the area ratio [(the total area corresponding to the complex oxide crystal phase portions)/(the total area corresponding to the alumina grains)] falls within the above range, the complex oxide crystal phase formed in an appropriate amount in the alumina grain boundary phase. In this case, excellent withstand voltage characteristics and high mechanical strength can be maintained even at high temperature. That is, more consistent withstand voltage characteristics and mechanical strength can be attained at high temperature. When the area ratio [(the total area corresponding to the pores)/(the total area corresponding to the alumina grains)] falls within the above range, dielectric breakdown, which would otherwise be caused from pores, can be prevented, whereby excellent withstand voltage characteristics and high mechanical strength can be maintained at high temperature. These area ratios may be regulated by modifying the Group 2/RE component ratio or the like.

The area ratios may be determined through the following procedure. Specifically, the insulator 3 formed of alumina-based sintered material is cut along the axial direction, and the cut surface is mirror-polished. The mirror-polished surface is observed under a scanning electron microscope (SEM) (e.g., acceleration voltage: 20 kV, spot size: 50, and COMPO image (composition image)), to thereby obtain a photoimage covering the entire polished surface. The total area corresponding to the alumina grains, the total area corresponding to portions of the complex oxide crystal phase, and the total area of pores in the image are measured, to thereby determine the respective area ratios. The total area corresponding to the alumina grains, the total area corresponding to portions of the complex oxide crystal phase, and the total area of pores may be measured through, for example, by use of Analysis Five (product of Soft Imaging System GmbH). When this graphic analysis software is employed, appropriate threshold values are predetermined so that any of the alumina grain portions, complex oxide crystal portions, and pore portions are selected in the entire image of the polished surface. The threshold values are predetermined in a manner similar to that employed in the aforementioned <Binarization method and conditions>, and respective areas are sequentially determined.

The spark plug of the present invention is produced through a method including a step of producing an insulator, the step including preparing a raw material powder containing, as predominant components, an Al compound powder, an Si compound powder, and a rare earth element compound powder, and an optional Group 2 element compound powder, the Group included in the periodic table defined by Recommendations 1990, IUPAC (hereinafter may be referred to as a Group 2 compound powder), and at specific compositional proportions; compacting the raw material powder; and sintering the compact. Hereinafter, the method of producing a spark plug 1, which is an embodiment of the spark plug of the present invention will be described in detail.

In the production of the spark plug 1, a raw material powder containing an Al compound powder, an Si compound powder, and a rare earth element compound powder, and an optional Group 2 compound powder, is prepared so that respective amounts satisfy the conditions (1) and (2). When the raw material powder contains components so as to satisfy the aforementioned conditions (1) and (2), complex oxide crystals can be formed in the alumina grain boundary phase during firing the raw material powder. In a specific procedure, a raw material powder including an Al compound powder, an Si compound powder, and a rare earth element compound powder, and an optional Group 2 compound powder is mixed in a slurry. The proportions of the powders are predetermined so that the conditions (1) and (2) are satisfied, preferably so that the Mg/Group 2 component ratio and/or the Group 2/rare earth component ratio fall within the aforementioned ranges. Mixing is preferably performed for 8 hours or longer, so that the mixing state of the raw material powder becomes uniform, and that the formed sintered body has high density.

No particular limitation is imposed on the Al compound powder, so long as it is a powder of a compound which forms an Al component through firing. Generally, alumina ($Al_2O_3$) powder is employed. Actually, Al compound powder might contain unavoidable impurities (e.g., Na). Therefore, the Al compound powder preferably has high purity, for example, 99.5% or higher. In order to yield a high-density alumina-based sintered material, generally, an Al compound powder having a mean particle size of 0.1 μm to 5.0 μm is preferably employed. The mean particle size is determined through the laser diffraction method (Microtrac particle size distribution measuring apparatus (MT-3000), product of Nikkiso Co., Ltd.).

No particular limitation is imposed on the Si compound powder, so long as it is a powder of a compound which forms an Si component through firing. Examples of the Si compound of inorganic powder include Si oxide (including complex oxides), silicon hydroxide, silicon carbonate, silicon chloride, silicon sulfate, silicon nitrate, and silicon phosphate. Specific examples include SiO2 powder. When an Si compound powder other than silicon oxide powder is employed, the amount of the powder is controlled by the unit of its oxide-reduced mass %. The purity and mean particle size of the Si compound powder are generally the same as those of the Al compound powder.

No particular limitation is imposed on the rare earth element compound powder, so long as it is a powder of a compound which forms a rare earth element component through firing. Examples of the rare earth element compound powder include powders of rare earth element oxides and complex oxides thereof. Examples of the rare earth element compound powder include powders of La2O3, Nd2O3, Pr2O3, Y2O3, or Yb2O3. When a rare earth element compound powder other than its oxide powder is employed, the amount of the powder is controlled by the unit of its oxide-reduced mass %. The purity and mean particle size of the rare earth element compound are generally the same as those of the Al compound powder.

No particular limitation is imposed on the Group 2 compound powder, so long as it is a powder of a compound which forms an Group 2 component through firing. Examples of the Group 2 compound of inorganic powder include Group 2 element oxides (including complex oxides thereof), Group 2 element hydroxides, Group 2 element carbonates, Group 2 element chlorides, Group 2 element sulfates, Group 2 element nitrates, and Group 2 element phosphates. Specific examples include Mg compound powders such as MgO powder and MgCO3 powder; Ba compound powders such as BaO powder and BaCO3 powder; Ca compound powders such as CaO powder and CaCO3 powder; and Sr compound powders such as SrO powder and SrCO3 powder. When a Group 2 compound powder other than its oxide powder is employed, the amount of the powder is controlled by the unit of its oxide-reduced mass %. The purity and mean particle size of the Group 2 compound powder are generally the same as those of the Al compound powder.

The raw material powder is dispersed in a solvent, and a hydrophilic binder is added to the dispersion. The thus-obtained slurry is mixed. Examples of the solvent employed for forming dispersion include water and alcohol. Examples of the hydrophilic binder include polyvinyl alcohol, water-soluble acrylic resin, gum arabic, and dextrin. These hydrophilic binders or solvents may be used singly or in combination of two or more species. The hydrophilic binder or solvent may be used in an amount of 0.1 to 5 parts by mass, preferably 0.5 to 3 parts by mass, with respect to 100 parts by mass of the raw material powder. When water is employed as a solvent, the solvent may be used in an amount of 40 to 120 parts by mass, preferably 50 to 100 parts by mass.

Subsequently, the thus-produced slurry is spray-dried through spray drying or a similar technique so as to adjust the mean particle size thereof to 30 to 200 μm, preferably 50 μm to 150 μm. The mean particle size is determined through the laser diffraction method (Microtrac particle size distribution measuring apparatus (MT-3000), product of Nikkiso Co., Ltd.).

Subsequently, the granulated product is press-molded through, for example, rubber pressing or metal mold pressing, to thereby yield a green mold. The outer surface of the thus-obtained green mold is polished by means of resinoid grind stone or the like, to thereby work the green mold to a desired shape.

The thus-polished finished green compact having a desired shape is fired in air at 1,450 to 1,650° C. for 1 to 8 hours, to thereby yield an alumina-based sintered material. When the firing temperature is 1,450 to 1,650° C., the sintered material tends to have sufficient density, and anomalous grain growth of the alumina component is prevented, whereby the produced alumina-based sintered material reliably has excellent withstand voltage characteristics and mechanical strength. Also, when the firing time is 1 to 8 hours, the sintered material tends to have sufficient density, and anomalous grain growth of the alumina component is prevented, whereby the produced alumina-based sintered material reliably has excellent withstand voltage characteristics and mechanical strength. In the course of temperature elevation from 1,450 to 1,650° C., rather than a low-melting-point glass phase, a high-melting-point complex oxide crystal phase is preferentially formed in the alumina grain boundary. Thus, the amount of the glass phase, which generally serves as a breakdown-causing point, is reduced. Instead, the alumina-based sintered material including therein a high-melting-point complex oxide crystal phase has excellent corrosion resistance, and exhibits excellent withstand voltage characteristics and high mechanical strength at high temperature. If needed, the shape and related properties of the thus-produced alumina-based sintered material may be modified again.

In order to deposit complex oxide crystals in the alumina grain boundary phase during firing the raw material powder, the raw material powder is prepared so that at least conditions (1) and (2) are satisfied.

Through the aforementioned procedure, the alumina-based sintered material can be produced. The insulator 3 of the spark plug 1 made of the alumina-based sintered material can be produced. Since the alumina-based sintered material satisfies the aforementioned conditions (1) to (3), the material has excellent corrosion resistance and exhibits small drops in withstand voltage characteristics and mechanical strength, when the temperature rises further from a high temperature to a higher temperature, and the withstand voltage characteristics and mechanical strength are ensured at high temperature. Therefore, the alumina-based sintered material is suitably used as an insulating material of the spark plug which is to be set in a conventional internal combustion engine or an internal combustion engine of a small-scale and/or a high-output mode.

The spark plug 1 having the insulator 3 formed of the alumina-based sintered material may be produced through, for example, the following procedure. Specifically, an electrode material such as an Ni-base alloy is worked to a specific shape, to thereby form the center electrode 2 and/or the ground electrode 6. Preparation and working of the electrode material may be performed sequentially. In one embodiment of the production, a melt of an Ni-base alloy having a composition of interest or a like material is prepared by means of a vacuum melting furnace, and an ingot is prepared from the melt through vacuum casting. The ingot is subjected to appropriate working processes such as hot working and wire drawing, to a shape and dimensions of interest, to thereby form the center electrode 2 and/or ground electrode 6. Alternatively, the inner member 8 is inserted into the cup-formed outer member 7, and the assembly is subjected to plastic working such as extrusion, whereby the center electrode 2 is formed.

Subsequently, one end of the ground electrode 6 is joined, through electric resistance welding or a similar technique, to the end surface of the metallic shell 4 formed through plastic working or the like to a shape of interest. Then, the center electrode 2 is integrated to the insulator 3 through a known technique. The insulator 3 is integrated into the metallic shell 4 to which the ground electrode 6 has been joined. Then, the forward end portion of the ground electrode 6 is bent toward the center electrode 2 so that one end of the ground electrode 6 faces the forward end portion of the center electrode 2, whereby the spark plug 1 is produced.

The spark plug 1 is employed as a spark plug of an automotive internal combustion engine such as a gasoline engine. In use, the screw portion 9 is fixed to a predetermined position of a head which defines a combustion chamber of the internal combustion engine (not illustrated) by screwing the portion 9 with an internal thread provided therethrough. Since the spark plug 1 has an insulator alumina-based sintered material satisfying the aforementioned conditions (1) to (3), the spark plug has excellent corrosion resistance and exhibits small drops in withstand voltage characteristics and mechanical strength, when the temperature rises further from a high temperature to a higher temperature, and the withstand voltage characteristics and mechanical strength are ensured at high temperature. Therefore, the spark plug 1 can be employed in any type of internal combustion engines. Specifically, the spark plug can be employed in a conventional internal combustion engine, and also, for example, in an internal combustion engine of a small-scale, which is required to employ a screw portion 9 having a nominal diameter of M10 or less, and/or in an high-output internal combustion engine employing a biofuel or a mixed fuel.

The spark plug of the present invention is not limited to the aforementioned embodiment and may be modified in various manners, so long as the object of the present invention can be attained.

EXAMPLES

Examples 1 to 18, and Comparative Examples 1 to 6

1. Production and Evaluation of Alumina-Based Sintered Materials

An alumina powder, an Si compound powder, a rare earth element compound powder, and a Group 2 element compound powder were mixed together, to thereby prepare a raw material powder. Table 1 shows species of the powders forming each raw material powder. Notably, the alumina powder, the Si compound powder, the Group 2 element compound powder, and the rare earth element compound powder each had a mean particle size of 1.6 to 1.8 μm. To each raw material powder, polyvinyl alcohol (binder) and water (solvent) were added, to thereby prepare a slurry.

The thus-obtained slurry was spray-dried through spray drying or a similar technique, to thereby prepare a granulated product having a mean spherical particle size of about 100 μm. Then, the granulated product was press-molded, to thereby yield a green compact for forming the insulator. The green compact was fired at 1,450° C. to 1,650° C. in air for 1 to 8 hours, and a glaze was applied onto a specific site of the fired compact, followed by firing again for finishing, to thereby produce alumina-based sintered material members of Examples 1 to 18 and Comparative Examples 1 to 6.

(Determination of Component Contents)

The composition of each of the produced alumina-based sintered materials; i.e., amounts of constitutional components, was quantitated through EPMA. Each alumina-based sintered material was observed at 20 vision fields (unit vision field: 180 μm×250 μm). The component contents obtained from the vision fields were arithmetically averaged, to thereby obtain each component content. Each component (mass %) was calculated with respect to the total component content as 100 mass %. TABLE 1 shows the results (COMPOSITION (mass %, OXIDE-REDUCED)). Also, the ratio "(the oxide-reduced rare earth element component content)/(the oxide-reduced Si component content)" was calculated, and the results are shown in TABLE 1 ("RE/Si"). The ratio "(the oxide-reduced Mg component content)/(the oxide-reduced Group 2 component content)" was calculated, and the results are shown in TABLE 1 ("Mg/G2"). The ratio "(the oxide-reduced Group 2 component content)/(the oxide-reduced rare earth element component content)" was calculated, and the results are shown in TABLE 1 ("G2/RE"). Notably, the component contents shown in TABLE 1 virtually coincided with the compositional proportions of the raw material powder.

(Detection of Complex Oxide Crystal Phase)

A cut surface of each alumina-based sintered member was polished, and the polished surface was subjected to X-ray analysis in the aforementioned manner by means of an X-ray diffractometer (model: MiniFlex, product of Rigaku). Through comparison of the thus-obtained X-ray diffraction chart with the JCPDS card and other analyses, the presence of at least one of the complex oxide crystals shown in TABLE 2 was confirmed in the alumina grain boundary phase of each of the alumina-based sintered members of Examples 1 to 18 and Comparative Examples 1 to 3. The alumina grain boundary phase of each of the alumina-based sintered members of Comparative Examples 4 to 6 was found to assume a glass phase, and no crystal was observed in the grain boundary phase.

(Mean Grain Size of Alumina Grains)

Arbitrarily cut cross-section of each alumina-based sintered member was mirror-polished, and the thus-polished surface was subjected to thermal etching at a temperature lower by 100° C. than the firing temperature for producing the alumina-based sintered member, over 10 minutes. An arbitrarily selected observation field (180×250 μm) in the treated surface was observed under a scanning electron microscope (SEM), and photoimages of the observed area (×2,000) were taken. In a manner similar to that as described above, the thus-taken photoimages were subjected to binarization. The mean grain size of the alumina grains was obtained by measuring alumina grain sizes through the intercept technique, assuming that the "high-color-density area" obtained through binarization is one crystal grain of complex oxide crystals, and by arithmetically averaging the obtained grain size measurements. TABLE 2 shown the data in the column of "ALUMINA MEAN SIZE."

(Aspect Ratio of Complex Oxide Crystals)

In a manner generally similar to that employed in the above "Mean grain size of alumina grains," the thus-treated surface of each alumina-based sintered member was observed under a scanning electron microscope (SEM), and photoimages of the treated surface were taken. The thus-

TABLE 1

| | COMPOSITION (mass %, OXIDE-REDUCED) | | | | | | | | | | | | |
|---|---|---|---|---|---|---|---|---|---|---|---|---|---|
| | $Al_2O_3$ | $SiO_2$ | MgO | BaO | CaO | SrO | $La_2O_3$ | $Nd_2O_3$ | $Pr_2O_3$ | $Y_2O_3$ | $Yb_2O_3$ | RE/Si | Mg/G2 | G2/RE |
| EX. 1 | 99.146 | 0.050 | 0.265 | 0.186 | | 0.228 | 0.125 | | | | | 2.500 | 0.390 | 5.432 |
| EX. 2 | 97.017 | 0.450 | 0.240 | | 0.268 | | | | | 2.025 | | 4.500 | 0.472 | 0.251 |
| EX. 3 | 99.177 | 0.050 | | 0.548 | | | 0.225 | | | | | 4.500 | 0.000 | 2.436 |
| EX. 4 | 98.141 | 0.450 | 0.010 | | 0.200 | 0.074 | | 1.125 | | | | 2.500 | 0.035 | 0.252 |
| EX. 5 | 97.652 | 0.238 | | | 1.145 | | | | | | 0.965 | 4.055 | 0.000 | 1.187 |
| EX. 6 | 98.528 | 0.327 | 0.036 | | | | | | | | 1.109 | 3.391 | 1.000 | 0.032 |
| EX. 7 | 97.765 | 0.268 | 0.055 | 0.325 | 0.256 | 0.459 | | | 0.872 | | | 3.254 | 0.050 | 1.256 |
| EX. 8 | 97.339 | 0.334 | 0.422 | 0.000 | 0.600 | 0.182 | 1.123 | | | | | 3.362 | 0.350 | 1.072 |
| EX. 9 | 97.883 | 0.215 | 0.326 | 0.234 | 0.324 | 0.222 | | 0.796 | | | | 3.702 | 0.295 | 1.389 |
| EX. 10 | 97.932 | 0.196 | 0.284 | 0.336 | | 0.425 | | | | 0.827 | | 4.219 | 0.272 | 1.264 |
| EX. 11 | 97.206 | 0.439 | 0.125 | 0.126 | 0.096 | 0.124 | | | | | 1.884 | 4.292 | 0.265 | 0.250 |
| EX. 12 | 98.176 | 0.295 | 0.106 | 0.324 | | 0.315 | | | 0.784 | | | 2.658 | 0.142 | 0.950 |
| EX. 13 | 98.302 | 0.324 | 0.156 | | 0.326 | | 0.892 | | | | | 2.753 | 0.324 | 0.540 |
| EX. 14 | 98.157 | 0.380 | 0.158 | | | 0.331 | | 0.974 | | | | 2.563 | 0.323 | 0.502 |
| EX. 15 | 98.376 | 0.324 | 0.114 | 0.095 | 0.056 | 0.225 | | | 0.810 | | | 2.500 | 0.233 | 0.605 |
| EX. 16 | 98.770 | 0.250 | 0.095 | 0.104 | 0.124 | | | | | 0.657 | | 2.628 | 0.294 | 0.492 |
| EX. 17 | 97.538 | 0.315 | 0.241 | 0.234 | | 0.336 | 1.336 | | | | | 4.241 | 0.297 | 0.607 |
| EX. 18 | 98.328 | 0.206 | 0.092 | 0.094 | 0.456 | | | | | | 0.824 | 4.000 | 0.143 | 0.779 |
| COMP. 1 | 97.169 | 0.47 | 0.34 | 0.412 | 0.388 | | | | | | 1.221 | 2.598 | 0.298 | 0.934 |
| COMP. 2 | 97.702 | 0.32 | 0.092 | | 0.256 | 0.174 | | | 1.456 | | | 4.550 | 0.176 | 0.359 |
| COMP. 3 | 96.855 | 0.482 | 0.198 | | 0.112 | 0.132 | | | | | 2.221 | 4.608 | 0.448 | 0.199 |
| COMP. 4 | 99.617 | 0.40 | 0.041 | 0.056 | 0.04 | 0.029 | 0.177 | | | | | 0.443 | 0.247 | 0.938 |
| COMP. 5 | 98.826 | 0.236 | 0.115 | 0.235 | | | | 0.588 | | | | 2.492 | 0.329 | 0.595 |
| COMP. 6 | 96.634 | 0.492 | 0.198 | 0.526 | 0.823 | 0.541 | | | | | 0.892 | 1.813 | 0.095 | 2.341 | taken photoimages were subjected to binarization. The mean aspect ratio of the complex oxide crystals was obtained by measuring the longer side and the shorter side of each "low-color-density area" through the intercept technique, assuming that the "low-color-density area" obtained through binarization is one crystal grain of alumina crystals, to thereby calculate the aspect ratios (longer side/shorter side), and by arithmetically averaging the measurements. The results are shown in TABLE 2 in the column of "COMPLEX OXIDE CRYST. ASPECT RATIO."

(Area Ratios of Crystal Phase and Pores)

Figure 2:
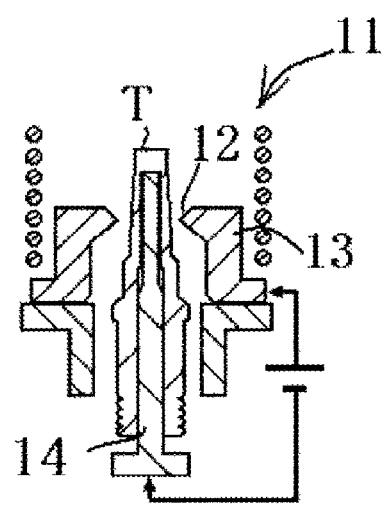
FIG. 2 is an end view schematically showing a withstand voltage measuring apparatus employed for determining withstand voltage characteristics in the Examples.

In a manner generally similar to that employed in determination of the "Mean grain size of alumina grains," a photoimage of the "entire treated surface" was taken. The obtained photoimage was processed by use of image-analysis software, to thereby determine the area ratio of the total area of the complex oxide crystal phase portions to that of the alumina grains, and the area ratio of the total area of the pores to that of the alumina grains. The results are shown in TABLE 2 in the column of "AREA RATIO" ("COMPLEX OXIDE/ALUMINA" and "PORE/ALUMINA").

measured at 600° C., 800° C., and 900° C., by means of a withstand voltage measuring apparatus 11 shown in FIG. 2. As shown in FIG. 2, the withstand voltage measuring apparatus 11 has a metallic circular member 12 in which surrounds, with space, the forward end portion of the test piece T, and a heater 13 for heating the test piece T. A center electrode 14 was inserted to the forward end of the axial hole of the test piece T, and the circular member 12 was placed so as to surround the forward end portion of the test piece T. In this setting, the withstand voltage of the test piece T; i.e., alumina-based sintered material, was measured. More specifically, the forward end portion of the test piece T was heated to the aforementioned predetermined temperature by means of the heater 13. When the circular member 12 reached a predetermined temperature, voltage was applied between the center electrode 14 and the circular member 12. When the test piece T underwent insulation breakdown; that is, the test piece T did not work as an insulator and impeded elevation of voltage, the voltage was measured and employed as the withstand voltage. TABLE 4 shows the measured withstand voltage values. Also, a percent drop in

TABLE 2

| | COMPLEX OXIDE CRYST. PHASE | ALUMINA MEAN SIZE (μm) | COMPLEX OXIDE CRYST. ASPECT RATIO | AREA RATIO | |
|---|---|---|---|---|---|
| | | | | COMPLEX OXIDE/ ALUMINA | PORE/ ALUMINA |
| EX. 1 | $(RE)Al_{11}O_{18}$ | 8.4 | 2.4 | 0.380 | 0.028 |
| EX. 2 | $(RE)_4Al_2O_9$ | 12.3 | 3.2 | 0.320 | 0.029 |
| EX. 3 | $(RE)AlO_3$ | 10.5 | 2.6 | 0.390 | 0.029 |
| EX. 4 | $Al(RE)O_3$ | 10.2 | 2.6 | 0.400 | 0.03 |
| EX. 5 | $Al_2(RE)_4O_9$ | 9.6 | 2.4 | 0.410 | 0.029 |
| EX. 6 | $(2A)Al_2O_4$ | 9.3 | 2.8 | 0.400 | 0.028 |
| EX. 7 | $(2A)_2AlO_4$ | 2.0 | 4.0 | 0.380 | 0.027 |
| EX. 8 | $(2A)Al_{12}O_{19}$ | 6.5 | 4.6 | 0.360 | 0.026 |
| EX. 9 | $(2A)_3SiO_5$ | 4.7 | 5.2 | 0.430 | 0.025 |
| EX. 10 | $(2A)_3Si_2O_7$ | 3.6 | 4.6 | 0.450 | 0.025 |
| EX. 11 | $(2A)Si_2O_5$ | 5.2 | 4.7 | 0.460 | 0.024 |
| EX. 12 | $(2A)(2A')SiO_4$ | 3.8 | 4.8 | 0.520 | 0.021 |
| EX. 13 | $(2A)(2A')_2SiO_7$ | 4.6 | 4.2 | 0.480 | 0.02 |
| EX. 14 | $(2A)_3(2A')Si_2O_8$ | 4.1 | 4.4 | 0.490 | 0.02 |
| EX. 15 | $(2A)Al_2Si_2O_8$ | 3.2 | 4.6 | 0.500 | 0.021 |
| EX. 16 | | 2.8 | 4.2 | 0.510 | 0.019 |
| EX. 17 | | 3.2 | 4.9 | 0.520 | 0.019 |
| EX. 18 | | 3.8 | 5.1 | 0.480 | 0.019 |
| COMP. 1 | | 11.5 | 1.8 | 0.040 | 0.028 |
| COMP. 2 | | 13.2 | 2.0 | 0.050 | 0.029 |
| COMP. 3 | | 11.8 | 1.8 | 0.020 | 0.028 |
| COMP. 4 | NO PHASE | 10.4 | — | — | 0.032 |
| COMP. 5 | | 12.4 | — | — | 0.028 |
| COMP. 6 | | 10.9 | — | — | 0.027 |

(Mechanical Strength)

In a manner similar to that employed in production of alumina-based sintered members of Examples 1 to 18 and Comparative Examples 1 to 6, test pieces (36 mm×4 mm×3 mm) were fabricated. In accordance with the measurement methods described in JIS R1601 and JIS A1604, the 3-point bending strength of each test piece was measured at 600° C., 800° C., and 900° C. (span: 30 mm). Also, a percent drop in strength with respect to the measurement at 600° C. [(1−strength at given temperature)/(strength at 600° C.)×100] was calculated. TABLE 3 shows the results.

(Withstand Voltage Test)

In a manner similar to that employed in production of alumina-based sintered members of Examples 1 to 18 and Comparative Examples 1 to 6, test pieces T each formed of an insulator and having a closed front end were fabricated. The withstand voltage (kV) of each test peace T was withstand voltage with respect to the measurement at 600° C. [(1−withstand voltage at given temperature)/(withstand voltage at 600° C.)×100] was calculated. TABLE 4 shows the results.

(Corrosion Test)

The same test pieces as employed in the aforementioned mechanical strength test, and the same test pieces as employed in the aforementioned withstand voltage test were fabricated. Each test piece was immersed in concentrated hydrochloric acid for 10 minutes at ambient temperature. Then, the test piece was removed from concentrated hydrochloric acid and subjected to the same mechanical strength test, to thereby determine the 3-point bending strength. Also, the test pieces for the withstand voltage test were subjected to the same withstand voltage test, to thereby determine withstand voltages. In addition, a percent drop in strength at 600° C. with respect to the measurement at 600° C. before corrosion test [(1−strength after corrosion test)/(strength at 600° C. before corrosion test)×100], and a percent drop in withstand voltage at 600° C. with respect to the measurement at 600° C. before corrosion test [(1−withstand voltage after corrosion test)/(withstand voltage at 600° C. before corrosion test)×100] were calculated. TABLES 3 and 4 show the results.

18, which satisfy all of conditions (1) to (3), exhibited higher withstand voltage and mechanical strength at 600° C., 800° C., and 900° C., and smaller drops in withstand voltage and mechanical strength at very high temperatures of 800° C. and 900° C. with respect to those measured at 600° C. Thus, the alumina-based sintered materials of the Examples were found to exhibit excellent withstand voltage characteristics

TABLE 3

| | STRENGTH (MPa) | | | | STRENGTH DROP (%) | | |
|---|---|---|---|---|---|---|---|
| | 600° C. | 800° C. | 900° C. | 600° C. AFTER CORROSION TEST | 800° C. | 900° C. | 600° C. AFTER CORROSION TEST |
| EX. 1 | 593 | 534 | 472 | 447 | 9.9 | 20.4 | 24.6 |
| EX. 2 | 586 | 533 | 467 | 445 | 9.0 | 20.3 | 24.1 |
| EX. 3 | 582 | 529 | 466 | 446 | 9.1 | 19.9 | 23.4 |
| EX. 4 | 588 | 535 | 467 | 452 | 9.0 | 20.6 | 23.1 |
| EX. 5 | 592 | 538 | 469 | 456 | 9.1 | 20.8 | 23.0 |
| EX. 6 | 594 | 540 | 471 | 456 | 9.1 | 20.7 | 23.2 |
| EX. 7 | 642 | 610 | 511 | 527 | 5.0 | 20.4 | 17.9 |
| EX. 8 | 652 | 628 | 518 | 535 | 3.7 | 20.6 | 17.9 |
| EX. 9 | 654 | 630 | 519 | 538 | 3.7 | 20.6 | 17.7 |
| EX. 10 | 662 | 659 | 525 | 545 | 0.5 | 20.7 | 17.7 |
| EX. 11 | 652 | 629 | 587 | 538 | 3.5 | 10.0 | 17.5 |
| EX. 12 | 665 | 640 | 604 | 547 | 3.8 | 9.2 | 17.7 |
| EX. 13 | 651 | 631 | 592 | 538 | 3.1 | 9.1 | 17.4 |
| EX. 14 | 648 | 629 | 589 | 535 | 2.9 | 9.1 | 17.4 |
| EX. 15 | 651 | 628 | 592 | 554 | 3.5 | 9.1 | 14.9 |
| EX. 16 | 652 | 627 | 594 | 569 | 3.8 | 8.9 | 12.7 |
| EX. 17 | 651 | 627 | 592 | 564 | 3.7 | 9.1 | 13.4 |
| EX. 18 | 658 | 635 | 599 | 578 | 3.5 | 9.0 | 12.2 |
| COMP. 1 | 448 | 360 | 293 | 226 | 19.6 | 34.6 | 49.6 |
| COMP. 2 | 446 | 358 | 283 | 235 | 19.7 | 36.5 | 47.3 |
| COMP. 3 | 469 | 371 | 303 | 229 | 20.9 | 35.4 | 51.2 |
| COMP. 4 | 452 | 354 | 312 | 216 | 21.7 | 31.0 | 52.2 |
| COMP. 5 | 449 | 368 | 304 | 214 | 18.0 | 32.3 | 52.3 |
| COMP. 6 | 457 | 354 | 283 | 218 | 22.5 | 38.1 | 52.3 |

TABLE 4

| | WITHSTAND VOLTAGE (kV) | | | | WITHSTAND VOLTAGE DROP (%) | | |
|---|---|---|---|---|---|---|---|
| | 600° C. | 800° C. | 900° C. | 600° C. AFTER CORROSION TEST | 800° C. | 900° C. | 600° C. AFTER CORROSION TEST |
| EX. 1 | 42.8 | 38.9 | 34.5 | 31.6 | 9.1 | 19.4 | 26.2 |
| EX. 2 | 43.5 | 39.2 | 35.2 | 32.4 | 9.9 | 19.1 | 25.5 |
| EX. 3 | 42.8 | 38.6 | 35.2 | 31.8 | 9.8 | 17.8 | 25.7 |
| EX. 4 | 41.7 | 37.8 | 32.6 | 31.2 | 9.4 | 21.8 | 25.2 |
| EX. 5 | 43.1 | 38.9 | 34.1 | 32.5 | 9.7 | 20.9 | 24.6 |
| EX. 6 | 42.8 | 38.5 | 33.8 | 31.5 | 10.0 | 21.0 | 26.4 |
| EX. 7 | 46.2 | 43.9 | 40.1 | 36.6 | 5.0 | 13.2 | 20.8 |
| EX. 8 | 46.7 | 44.8 | 40.2 | 36.2 | 4.1 | 13.9 | 22.5 |
| EX. 9 | 46.9 | 44.9 | 40.1 | 36.9 | 4.3 | 14.5 | 21.3 |
| EX. 10 | 46.5 | 44.3 | 40.9 | 37.1 | 4.7 | 12.0 | 20.2 |
| EX. 11 | 48.2 | 47.2 | 43.4 | 39.9 | 2.1 | 10.0 | 17.2 |
| EX. 12 | 49.7 | 47.8 | 45.9 | 40.8 | 3.8 | 7.6 | 17.9 |
| EX. 13 | 48.8 | 46.9 | 44.7 | 40.3 | 3.9 | 8.4 | 17.4 |
| EX. 14 | 48.3 | 46.5 | 44.4 | 40.1 | 3.7 | 8.1 | 17.0 |
| EX. 15 | 48.6 | 46.8 | 45.2 | 41.4 | 3.7 | 7.0 | 14.8 |
| EX. 16 | 48.8 | 46.9 | 45.2 | 42.8 | 3.9 | 7.4 | 12.3 |
| EX. 17 | 49.2 | 47.3 | 45.7 | 43.1 | 3.9 | 7.1 | 12.4 |
| EX. 18 | 48.6 | 46.8 | 45.2 | 42.6 | 3.7 | 7.0 | 12.3 |
| COMP. 1 | 38.2 | 29.9 | 26.2 | 17.4 | 21.7 | 31.4 | 54.5 |
| COMP. 2 | 36.7 | 29.2 | 23.7 | 16.8 | 20.4 | 35.4 | 54.2 |
| COMP. 3 | 35.6 | 28.3 | 23.9 | 15.2 | 20.5 | 32.9 | 57.3 |
| COMP. 4 | 36.1 | 27.5 | 24.7 | 17.2 | 23.8 | 31.6 | 52.4 |
| COMP. 5 | 36.4 | 28.9 | 25.2 | 17.1 | 20.6 | 30.8 | 53.0 |
| COMP. 6 | 35.9 | 27.6 | 22.1 | 16.7 | 23.1 | 38.4 | 53.5 |

As is clear from TABLES 1 to 4, as compared with the alumina-based sintered materials of Comparative Examples 1 to 6, which do not satisfy at least one of conditions (1) to (3), the alumina-based sintered materials of Examples 1 to 18 and mechanical strength. Furthermore, as compared with the alumina-based sintered materials of Comparative Examples 1 to 6, the alumina-based sintered materials of Examples 1 to 18 maintained excellent performance at 600° C. after the corrosion test, and exhibited smaller drops in withstand voltage and mechanical strength at 600° C. before the corrosion test, with respect to those measured at 600° C. after the corrosion test.

The alumina-based sintered materials of Examples 7 to 18, which satisfy conditions (1) to (3) with an Mg/Group 2 component ratio satisfying condition (4), had a mean alumina grain size of 2 to 6.5 μm and a complex oxide crystal aspect ratio of 4 or higher. The alumina-based sintered materials of Examples 11 to 18, which have a Group 2/RE component ratio satisfying condition (5), had an area ratio (complex oxide crystal/alumina grains) of 0.46 or higher, and an area ratio (pore/alumina grains) of 0.024 or less. As compared with the alumina-based sintered materials of Examples 1 to 6, the alumina-based sintered materials of Examples 7 to 18 exhibited more excellent withstand voltage and mechanical strength at high temperature (600° C. or higher). In addition, the alumina-based sintered materials of Examples 7 to 18 exhibited a drop in withstand voltage and mechanical strength at 800° C. with respect to those measured at 600° C. of 5% or lower. The alumina-based sintered materials of Examples 11 to 18 exhibited a drop in withstand voltage and mechanical strength at 900° C. with respect to those measured at 600° C. of 10% or lower.

DESCRIPTION OF REFERENCE NUMERALS 1 spark plug
2 center electrode
3 insulator
4 metallic shell
5 noble metal tip
6 ground electrode
7 outer member
8 inner member
9 screw portion
G spark discharge gap Having described the invention, the following is claimed:

1. A spark plug having an insulator formed of an alumina-based sintered material which contains an Si component and a rare earth element component in such amounts that satisfy the following conditions (1) and (2):
   (1) an oxide-reduced amount of the Si component (mass %) is greater than or equal to 0.05 and less than or equal to 0.45; and
   (2) a ratio of an oxide-reduced amount of the rare earth element component to the oxide-reduced amount of the Si component is greater than or equal to 2.5 and less than or equal to 4.5, and which has alumina grains and an alumina grain boundary phase including a complex oxide crystal phase satisfying the following condition (3):
   (3) the complex oxide crystal phase contains at least two components selected from among an Al component, an Si component, a Group 2 element component, the Group included in the periodic table defined by Recommendations 1990, IUPAC, (hereinafter may be referred to simply as a Group 2 component), and a rare earth element component.

2. A spark plug according to claim 1, wherein the alumina-based sintered material contains the Al component in an oxide-reduced amount of 97 mass % or more, with respect to the total mass of the alumina-based sintered material as 100 mass %.

3. A spark plug according to claim 1, wherein the alumina-based sintered material contains the Group 2 component in such an amount that satisfies the following condition (4):
   (4) a ratio of an oxide-reduced amount of an Mg component to an oxide-reduced amount of the Group 2 component is greater than or equal to 0.05 and less than or equal to 0.35;
   the alumina grains have a mean grain size of 2 to 6.5 μm; and
   the complex oxide crystal phase includes crystals containing the Al component.

4. A spark plug according to claim 1, wherein the alumina-based sintered material contains the Group 2 component and the rare earth element component in such amounts that satisfy the following condition (5):
   (5) a ratio of an oxide-reduced amount of the Group 2 component to the oxide-reduced amount of the rare earth element component is greater than or equal to 0.25 and is less than or equal to 0.95.

5. A spark plug according to claim 4, wherein, in an arbitrary cut surface of the insulator formed of the alumina-based sintered material, a total area corresponding to the alumina grains, a total area corresponding to portions of the complex oxide crystal phase, and a total area of pores satisfy the following conditions:
   a ratio of a total area corresponding to the complex oxide crystal phase portions to the total area corresponding to the alumina grains is greater than or equal to 0.46; and
   a ratio of a total area corresponding to the pores to the total area corresponding to the alumina grains is less than or equal to 0.024.

* * * * *